(No Model.) 2 Sheets—Sheet 1.
E. W. RICE, Jr.
DYNAMO ELECTRIC MACHINE.
No. 526,743. Patented Oct. 2, 1894.
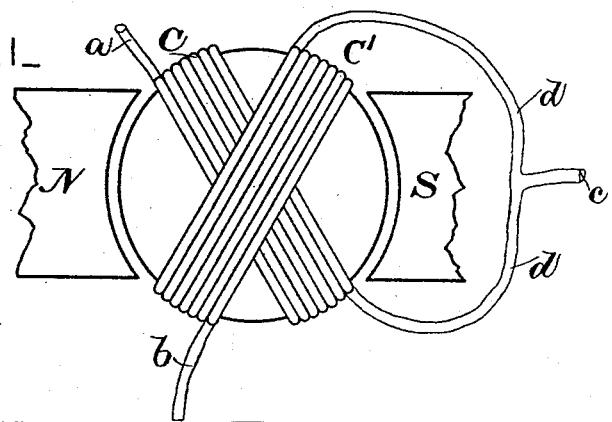
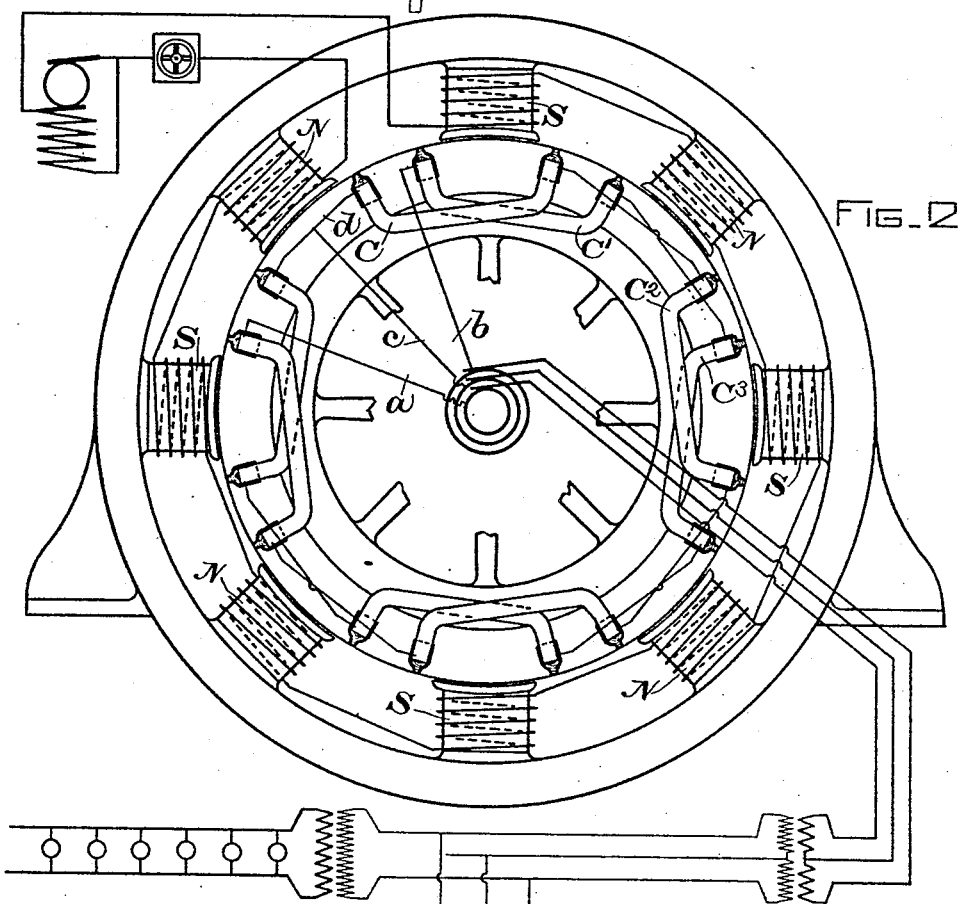
WITNESSES
Henry Westendarp.
J. J. Johnston.
INVENTOR
Edwin W. Rice, Jr. by
Bentley and Blodgett
Attys.

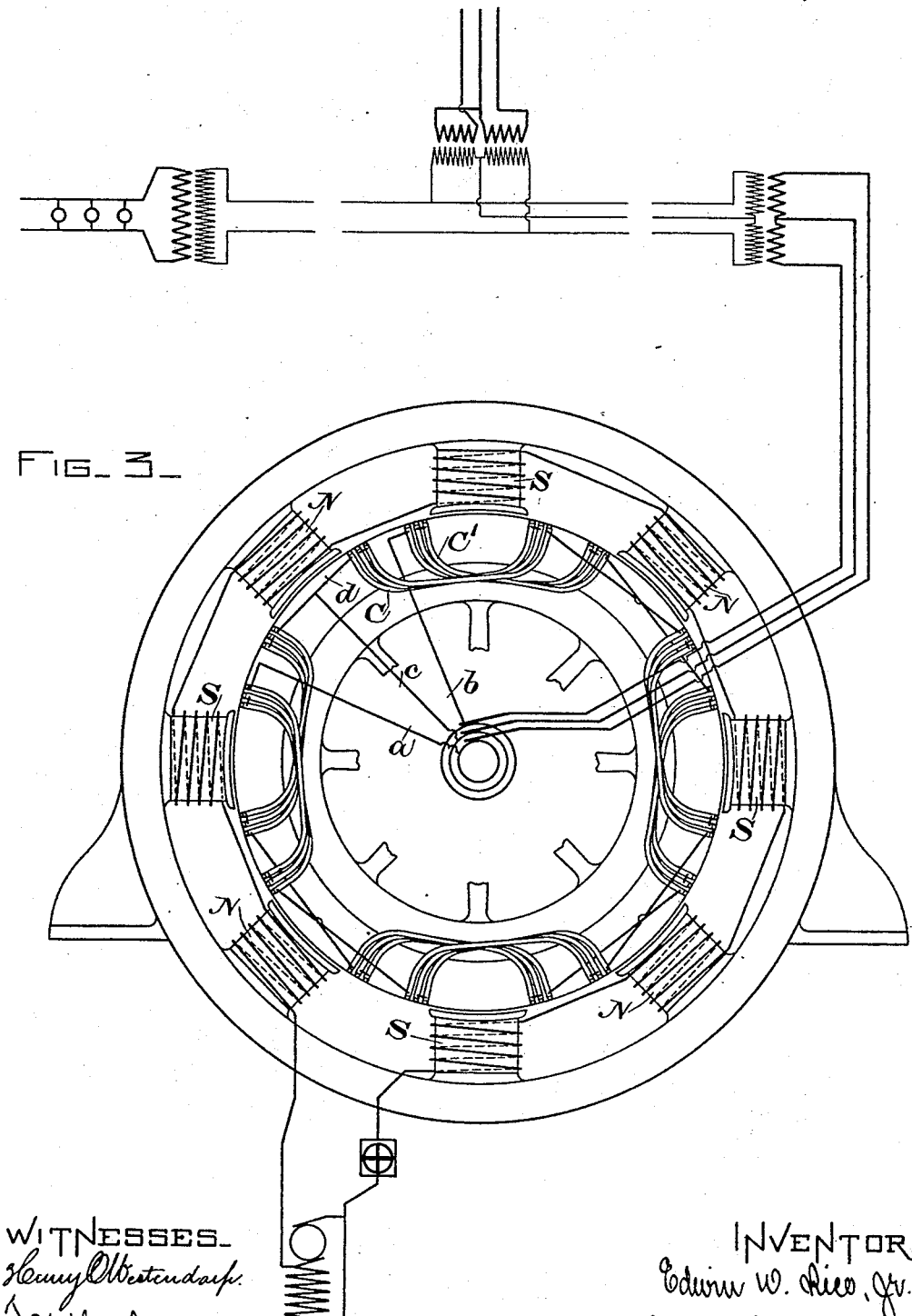

UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

DYNAMO-ELECTRIC MACHINE.

SPECIFICATION forming part of Letters Patent No. 526,743, dated October 2, 1894.

Application filed February 28, 1894. Serial No. 501,777. (No model.)

*To all whom it may concern:*

Be it known that I, EDWIN W. RICE, Jr., a citizen of the United States, residing at Swampscott, in the county of Essex, State of Massachusetts, have invented certain new and useful Improvements in Dynamo-Electric Machines, of which the following is a specification.

My invention relates to those alternating current generators which are adapted to deliver both single and multiphase currents from the same armature winding, such winding comprising coils angularly disposed about the armature, which act in series to deliver currents of single-phase character, and from intermediate points between which and the other terminals leads are taken out, from which currents of displaced phases are obtainable. If in such a winding active wire is at all times under the field magnet poles it is evident that opposing electro-motive forces will at times be set up in the two coils which are displaced in position; that is, one coil will at times act differentially to the other, and therefore the effective electro-motive force of the two coils acting in series will be diminished and will only be equal to the difference between them at the times when the windings are opposed.

The object of my present invention is to avoid this differential action of the displaced coils; and it therefore consists in a method of eliminating the back or counter-electro-motive force of a part of such coils connected in series and revolving in a magnetic field, by so arranging the angular distance which they cover upon the armature with relation to the angular space covered by the field magnet poles that the total flux of magnetic force will at certain times in the revolution be included by the coils, or coincidently pass through the axes of the coils in its entirety, or practically so. The sections of winding at this time may be considered as a single coil and as though they were in the same plane at the neutral position. My improved winding is more particularly adapted to the case of a bipolar structure in which two coils are relatively placed with respect to each other at an angle of sixty degrees, or thereabout, or have an angular relation in a multipolar structure which gives corresponding effects, although it may be applied to other cases. The arrangement indicated so disposes the coils that practically they do not cut lines of force at the time of reversal, and thus act together at all times.

The accompanying drawings show diagrammatic representations of my invention, Figures 1 and 2 illustrating respectively bipolar and multipolar structures, while Fig. 3 shows a modification.

In Fig. 1 I show the elementary form of the invention, where N, S are the field magnet poles, and C, C' are the coils forming the winding of the armature. The coils C, C' are displaced sixty degrees, wound in the same direction, and connected by a conductor $d$. Between the terminals $a$, $b$ I may obtain single-phase currents due to the added electro-motive forces in the coils C, C', and between $a$, $c$ and $b$, $c$ currents of displaced phase corresponding to the angular relation of the coils and due to the electro-motive force of each coil by itself may be obtained. In the present invention the width of the poles N, S is made approximately equal to or somewhat less than the larger angular distance between the coils C, C', as shown in the figure, and therefore the total flux of magnetic lines is included by both coils C, C' in such position; and also the electro-motive force generated in one coil is not opposed by a counter-electromotive force in the other coil, and therefore the effective potential of the two coils acting in series is increased. Of course the same relation of the coils may be embodied in a Gramme or other winding, instead of a drum winding, as shown.

In Fig. 2 I show the application of the invention to a multipolar machine, the coils C, C' being wound in slots and bearing the same relation to each other as in Fig. 1. The coils C', $C^3$, &c., and C, $C^2$, &c., are connected in series so that their potential is added, and from their junction $d$, which corresponds to the conductor $d$, Fig. 1, is taken the lead $c$, corresponding to the lead $c$, Fig. 1, the other terminals $a$, $b$ also corresponding to the terminals $a$, $b$ of the former figure. The operation of a system of distribution by such currents is described in my application, Serial No. 497,893, filed January 24, 1894.

In Fig. 3 I show how the coils C, C' may each be divided into a number of parts, two, three or more, occupying each its own armature slot, and thus diminishing the self-induction of the coils. The relation of the coils as in my invention is, however, preserved; and this combination of divided coils disposed as in my invention herein pointed out I consider of especial value.

What I claim as new, and desire to secure by Letters Patent of the United States, is—

1. The method of eliminating the back or counter-electro-motive force of a part of a number of coils connected in series and revolving in a magnetic field, which consists in causing the entire magnetic flux to pass coincidently through the axes of the coils during part of their revolution.

2. The method of eliminating the differential action of a part of a number of coils connected in series and revolving in a magnetic field, said coils being angularly displaced with reference to one another, which consists in causing the entire magnetic flux to pass coincidently through the axes of the coils during part of their revolution.

3. In an alternating current dynamo-electric machine, an armature carrying coils angularly displaced with reference to each other, each coil divided into different portions connected in series, and field magnet poles embracing an arc substantially equal to or less than the greatest angular displacement between the coils; whereby the entire magnetic flux may pass coincidently through the axes of the coils, substantially as set out herein.

4. An alternating current dynamo electric machine comprising an armature carrying coils connected in series, and angularly displaced with reference to one another, connections to external circuits from the ends and an intermediate portion of said coil and field magnetic poles embracing an arc substantially equal to, or less than the greatest angular displacement between the coils, whereby the entire magnetic flux may pass coincidently through the axes of the coils.

In witness whereof I have hereunto set my hand this 26th day of February, 1894.

EDWIN W. RICE, Jr.

Witnesses:
ELIHU THOMSON,
JOHN W. GIBBONEY.